United States Patent
Ishikawa

(10) Patent No.: US 6,287,236 B1
(45) Date of Patent: Sep. 11, 2001

(54) PARKING BRAKE APPARATUS FOR INDUSTRIAL VEHICLE

(75) Inventor: Kazuo Ishikawa, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/511,535

(22) Filed: Feb. 23, 2000

(30) Foreign Application Priority Data

Feb. 24, 1999 (JP) .................................................. 11-046205
Oct. 18, 1999 (JP) .................................................. 11-295178

(51) Int. Cl.$^7$ .................................................. B60K 41/02
(52) U.S. Cl. .................................................. 477/71; 192/18 A
(58) Field of Search .................................. 192/219.4, 225, 192/18 A, 87.13, 87.18; 477/71, 186

(56) References Cited

U.S. PATENT DOCUMENTS 5,053,960 * 10/1991 Brekkestran et al. ............. 364/424.1
5,918,509 * 7/1999 Heilig et al. ......................... 74/730.1

FOREIGN PATENT DOCUMENTS

010132952-A * 2/1989 (JP) .
01030862-A * 2/1989 (JP) .
06-247190 9/1994 (JP) .

* cited by examiner

Primary Examiner—Dirk Wright
(74) Attorney, Agent, or Firm—Morgan & Finnegan, LLP

(57) ABSTRACT

A parking brake for maintaining an industrial vehicle in a stationary position is kept engaged by a holding mechanism. The parking brake is disengaged by a releasing mechanism. Whether the vehicle speed is equal to greater than a predetermined value is determined based on a detection signal from a speed detector. If the vehicle speed is less than the predetermined value, the releasing mechanism is controlled such that the parking brake is automatically engaged.

6 Claims, 3 Drawing Sheets

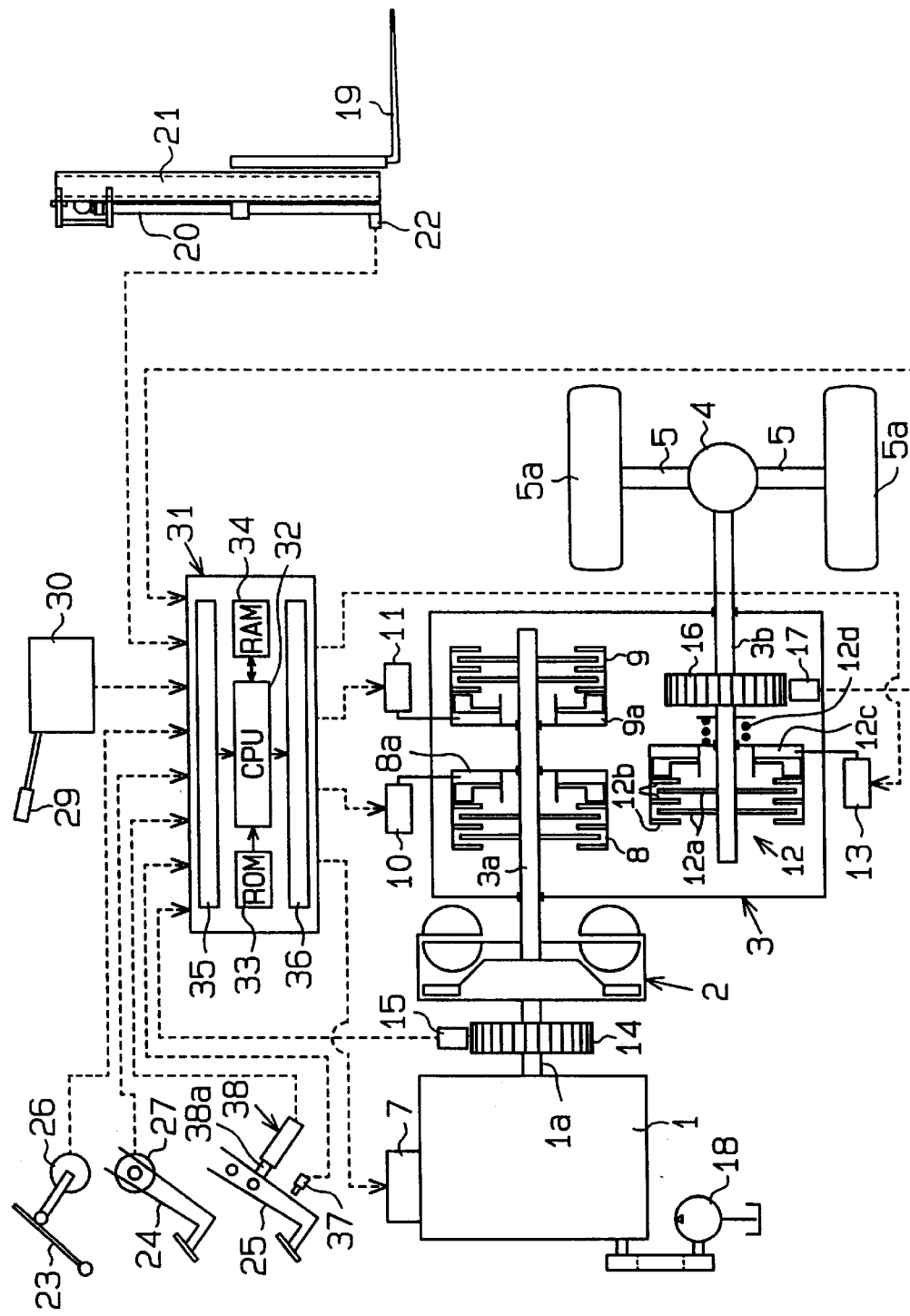

PARKING BRAKE APPARATUS FOR INDUSTRIAL VEHICLE

BACKGROUND OF THE INVENTION

The present invention relates to a parking brake apparatus for industrial vehicles.

Like ordinary automobiles, industrial vehicles, such as forklifts, have a service brake and a parking brake. The service brake is used for controlling speed when the vehicle is moving and for stopping the vehicle. The parking brake is for maintaining the vehicle in a stationary position when the vehicle engine is not in gear. The parking brake is connected to a parking lever by a cable or a link. The parking lever is manipulated by a hand or a foot. A manipulation force applied to the lever is transmitted to the parking brake by the cable or the link.

Japanese Unexamined Patent Publication No. 6-247190 discloses an industrial vehicle having an auxiliary brake. The vehicle has a transmission, which includes a torque converter and hydraulic forward and reverse clutches. The auxiliary brake is located in the transmission. When the vehicle is moving and handling a load at the same time, the handling speed of the load is controlled based on the manipulation amount of a loading lever. Specifically, the engine throttle is controlled by manipulating the loading lever. The load manipulation speed is controlled based on the engine throttle. The vehicle speed is set to a target value regardless of the engine speed. The target value of the vehicle speed is determined based on the depression amount of an acceleration pedal. That is, the braking force of the auxiliary brake and the engagement of one of the forward and backward clutches are controlled such that the vehicle speed matches the target value.

The parking brake is switched between a parking position and a release position by manipulating a parking brake lever. The parking brake lever takes up space in the operator cab, which reduces the space for other accessories and limits the flexibility of the design.

When parking the vehicle the operator must switch the parking lever to the braking position and when starting the vehicle must release the lever to the release position, which makes the operation troublesome. When temporarily stopping the vehicle on a sloped road, the operator must either use the parking brake or keep the brake pedal depressed to actuate the service brake, which also makes the operation troublesome. If the operator only uses the service brake when temporarily stopped on a sloped road, releasing the brake pedal causes the vehicle to move away from the desired location.

The vehicle disclosed in Japanese Unexamined Patent Publication No. 6-247190 has the auxiliary brake in addition to the service brake. However, the auxiliary brake cannot be used as a parking brake. Thus, when temporarily stopping the vehicle on a sloped road, the operator must keep the brake pedal depressed or use the parking break.

SUMMARY OF THE INVENTION

Accordingly, it is an objective of the present invention to provide a parking brake apparatus that eliminates the necessity for a parking lever and also eliminates the necessity for continuously depressing a brake pedal when temporarily stopping a vehicle on a slope.

A second objective of the present invention is to provide a parking brake apparatus for industrial vehicles that prevents the vehicle from being moved in an undesirable direction when the parking brake is released when the vehicle is on a sloped road.

A third objective of the present invention is to provide a parking brake device for industrial vehicles that permits the vehicle to creep after the parking brake has been released after having temporarily stopped the vehicle when moving very slowly, by changing the force applied to the brake controller.

To achieve the foregoing and other objectives and in accordance with the purpose of the present invention, a parking brake apparatus for an industrial vehicle is provided. The apparatus includes a braking member for maintaining the industrial vehicle in a stationary position, holding means for holding the braking member in an engaged state, releasing means for releasing the braking member from the engaged state and first detection means for detecting the speed of the vehicle and generating a speed indication signal. The apparatus further includes determination means and control means. The determination means determines whether the vehicle speed is equal to or less than a predetermined value based on the speed indication signal from the first detection means, and generates a first determination signal. The control means controls the releasing means to engage the braking member, based on the first determination signal.

The present invention may also be embodied in an industrial vehicle having a parking brake for maintaining the industrial vehicle in a stationary position. The vehicle includes holding means for holding the parking brake in an engaged state, releasing means for releasing the parking brake from the engaged state and a vehicle speed detector for detecting a speed of the vehicle. The vehicle also includes determination means and a controller. The determination means determines whether the vehicle speed is equal to or less than a predetermined value based on a signal from the speed detector. When the controller detects that the vehicle speed is equal to or less than the predetermined value based on a determination signal from the determination means, the controller controls the releasing means to engage the parking brake.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, is best understood by reference to the following description of the presently preferred embodiments together with the accompanying drawings in which:

FIG. 4 is a diagrammatic view showing an apparatus according to a second embodiment of the present invention.

DETAILED DESCRIPTION OF THE PREFERRED EMBODIMENTS

A braking apparatus according to a first embodiment of the present invention will now be described with reference to the drawings. The apparatus is used in an industrial vehicle, which is a forklift in this embodiment.

Figure 1:
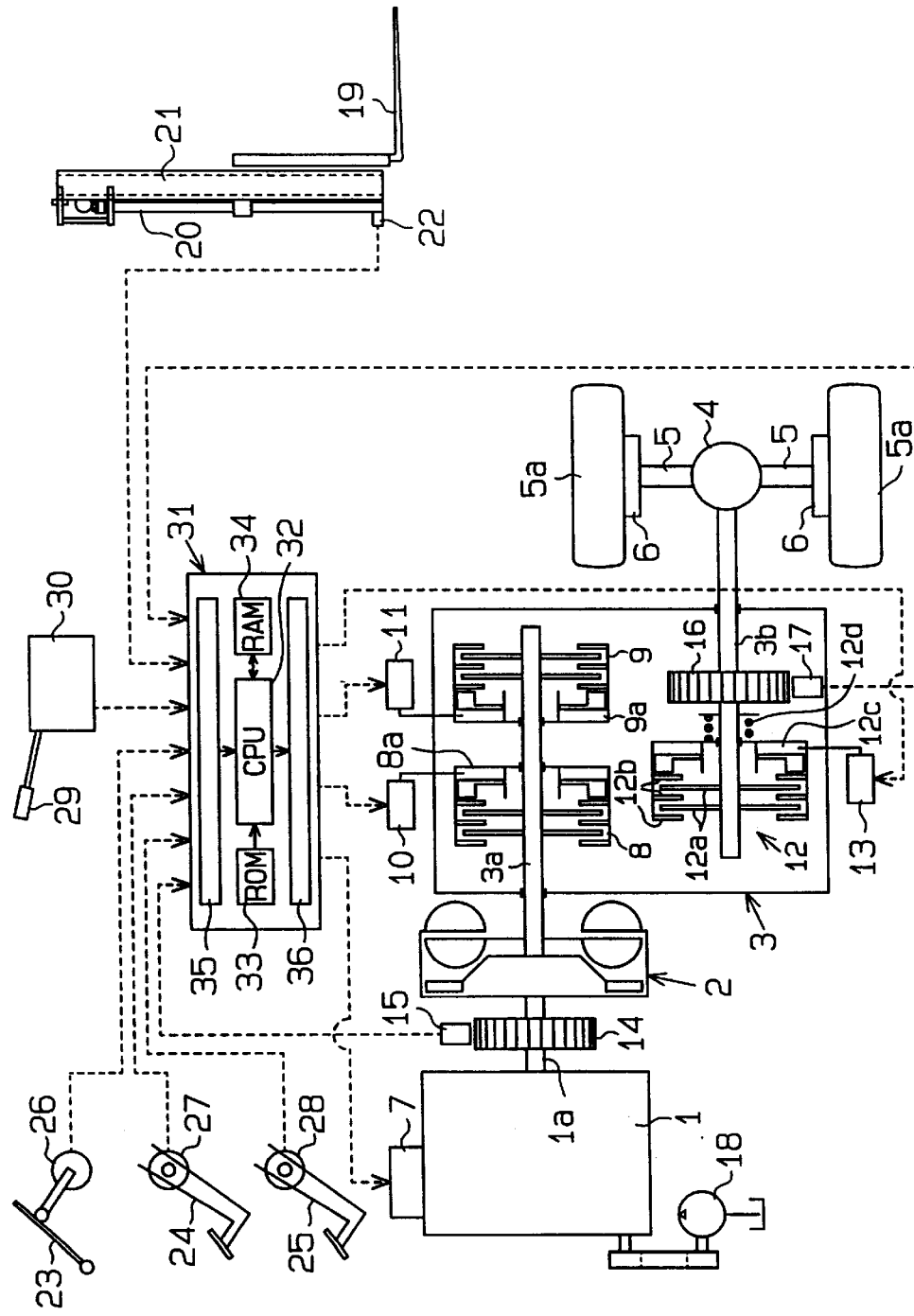
FIG. 1 is a diagrammatic view showing an apparatus according to first embodiment of the present invention.

As shown in FIG. 1, an output shaft 1a of an engine 1 is coupled to a transmission 3. The transmission 3 has a torque converter 2 and is coupled to shafts 5 through a differential gear 4. Each shaft 5 is coupled to a driven wheel 5a and has a service brake 6. The engine 1 has a throttle actuator 7. The throttle actuator 7 controls the throttle opening thereby controlling the engine speed, or the number of rotations of the output shaft 1a.

The transmission 3 has an input shaft (main shaft) 3a and an output shaft (counter shaft) 3b. A forward clutch 8 and a reverse clutch 9 are located on the input shaft 3a. Gears (not shown) are provided between the forward clutch 8 and the output shaft 3b and between the reverse clutch 9 and the output shaft 3b. Rotation of the input shaft 3a is transmitted through the clutches 8, 9 and the gears. The clutches 8, 9 are preferably multiple disk hydraulic wet clutches. The engagement force of the clutches 8, 9 is controlled by changing the oil pressure in oil chambers 8a, 9a. That is, the engagement force is increased by increasing the oil pressure in the chambers 8a, 9a. The oil pressure in the chambers 8a, 9a is controlled by a forward clutch valve 10 and a reverse clutch valve 11. The clutch valves 10, 11 are proportional solenoid valves. Each clutch valve 10, 11 controls the valve opening in accordance with the level of a current supplied thereto.

A parking brake 12 is located on the transmission output shaft 3b. In other words, the parking brake 12 is located within in the transmission 3. The parking brake 12 includes disks 12a, which rotate integrally with the output shaft 3b, and brake pads 12b, which do not rotate relative to the output shaft 3b. The brake pads 12b serve as braking members. Each brake pad 12b is urged by a spring 12d toward the corresponding disk 12a. The spring 12d urges the pads 12b to generate engaging pressure to stop the output shaft 3b. The parking brake 12 has a pressure chamber 12c. A brake valve 13 supplies oil pressure to the chamber 12c. The force of the pressure in the chamber 12c disengages the pads 12b from the disks 12a. The brake valve 13 includes an electromagnetic valve. The spring 12d functions as a holding means to hold the brake pads 12b at an engaged position. The brake valve 13 functions as a releasing means to release the brake pads 12b from the engaged position.

Although the torque converter 2, the transmission 3 and the valves 10, 11, 13 are independently described in FIG. 1, these devices are housed in a single housing to form an automatic transmission device. The transmission 3 includes a hydraulic pump (not shown) to supply oil to the pressure chambers 8a, 9a, 12c through passages (not shown) and the valves 10, 11, 13. The hydraulic pump is actuated by the rotational force of the transmission 3 when the engine 1 is running.

A first gear 14 is fixed to the engine output shaft 1a to integrally rotate with the shaft 1a. An engine speed sensor 15 is located in the vicinity of the gear 14 to detect the engine speed. The engine speed sensor 15 includes a magnetic pickup for sensing the teeth of the first gear 14. The engine speed sensor 15 outputs pulse signals proportional to the number of rotations of the output shaft 1a. A second gear 16 is fixed to the transmission output shaft 3b to integrally rotate with the shaft 3b. A vehicle speed detection means, which is a vehicle speed sensor 17, is located in the vicinity of the second gear 16. The vehicle speed sensor 17 includes a magnetic pickup for sensing the teeth of the second gear 16. The vehicle speed sensor 17 outputs pulse signals proportional to the number of rotations of the output shaft 3b.

A hydraulic pump 18 is driven by the engine 1. The pump 18 is connected to a lift cylinder 20 and to a tilt cylinder (not shown) through pipes (not shown). The lift cylinder 20 lifts and lowers a fork 19. The tilt cylinder tilts a mast 21. A pressure sensor 22 is attached to the lift cylinder 20. The pressure sensor 22 functions as a load weight detection means that detects the weight or load on the fork 19, more particularly the pressure sensor 22 detects the oil pressure in the lift cylinder 20 and outputs a detection signal proportional to the weight of load on the fork 19.

An acceleration means, which is an acceleration pedal 23 in this embodiment, is provided on the floor of the cab. An inching pedal 24 and a brake pedal 25 are also provided on the floor of the cab. The inching pedal 24 and the brake pedal 25 both function as braking means. The inching pedal 24 is used for moving the forklift very slowly when there is a load on the fork 19. Specifically, the inching pedal 24 is used for partially engaging the clutches 8, 9. When the brake pedal 25 is depressed, the brake pedal 25 moves independently from the inching pedal 24. When the inching pedal 24 is depressed, the brake pedal 25 is also moved when the depression amount of the inching pedal 24 exceeds a predetermined amount. That is, until the inching pedal 24 reaches an inching position, the inching pedal 24 is operated independently from the brake pedal 25. If the inching pedal 24 is depressed beyond the inching position, the brake pedal 25 is moved integrally with the inching pedal 24.

An acceleration detection means, which is an acceleration sensor 26, is attached to the acceleration pedal 23. The acceleration sensor 26 outputs detection signals proportional to the depression amount of the acceleration pedal 23. An inching switch 27 detects whether the inching pedal 24 is at the inching position. A brake switch 28, which functions as a braking detection means, detects whether the brake pedal 25 is being manipulated.

A switching means, which is a shift lever 29 in this embodiment, is provided in the front part of the cab. The position of the shift lever 29 is detected by a shift switch 30. The shift switch 30 detects whether the shift lever 29 is at a forward position F, a reverse position R or a neutral position N and outputs a signal representing the current lever position.

The electrical circuit for actuating and controlling the throttle actuator 7, the forward clutch valve 10, the reverse clutch valve 11 and the brake valve 13 will now be described.

A controller 31 includes a central processing unit (CPU) 32, a read only memory (ROM) 33, a random access memory (RAM) 34, an input interface 35 and an output interface 36. The CPU 32 functions as a control means and as a determination means. The ROM 33 stores control programs such as a program for determining when to actuate the parking brake 12 and various data necessary for executing the control programs. The RAM 34 temporarily stores computation results of the CPU 32. The CPU 32 operates based on the control programs stored in the ROM 33.

The engine speed sensor 15, the vehicle speed sensor 17, the inching switch 27, the brake switch 28 and the shift switch 30 are connected to the CPU 32 through the input interface 35. The pressure sensor 22 and the acceleration sensor 26 are connected to the CPU 32 through an analog-to-digital (A/D) converter and the input interface 35.

The CPU 32 is connected to the throttle actuator 7, the forward clutch valve 10, the reverse clutch valve 11 and the brake valve 13 through the output interface 36 and a driver (not shown).

Figure 2:
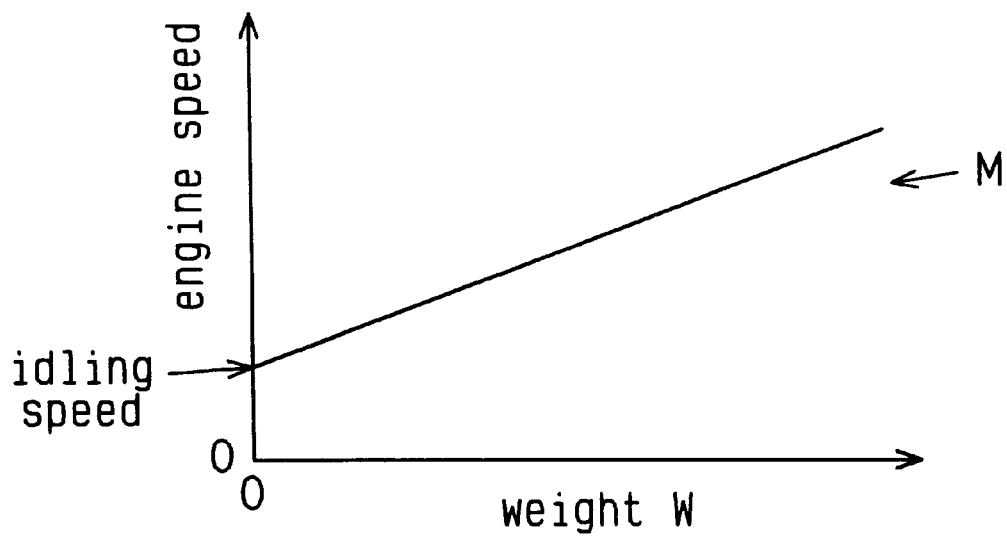
FIG. 2 is a first graph showing the relationship between the weight of a load and threshold engine speeds for releasing a brake of the embodiment shown in FIG. 1.

The ROM 33 stores a map showing the relationship between the depression amount of the acceleration pedal 23 and the throttle opening. The ROM 33 also stores data representing an opening degree of the forward clutch valve 10 and the reverse clutch valve 11 for inching the forklift. The data for inching the forklift represents an opening degree of the valves 10, 11 that partially engages the forward clutch 8 and the reverse clutch 9. Further, the ROM 33 stores a map M representing the relationship between the weight W of a load on the fork 19 and threshold engine speeds NE at which the brake 12 is disengaged. As shown in FIG. 2, the threshold engine speeds NE at which the brake 12 is released increases proportionally as the load weight W increases. The threshold engine speed NE when the load weight is zero is set to an idling speed. Instead of the map M, an equation representing the relationship between the threshold engine speed NE and the load weight W may be stored in the ROM 33.

The CPU 32 receives signals from the sensors 15, 17, 22, 26 and the switches 27, 28, 30, operates according to the control programs stored in the ROM 33 and outputs command signals to the throttle actuator 7 and the valves 10, 11, 13.

The CPU 32 controls the throttle actuator 7 such that the engine speed matches a target engine speed, which corresponds to the depression amount of the acceleration pedal 23. Based on an inching signal from the inching switch 27 and on a shift signal from the shift switch 30, the CPU 32 controls one of the clutch valves 10, 11 to partially engage one of the clutches 8, 9 that corresponds to the position of the shift lever 29.

The CPU 32 determines whether the vehicle speed is less than a stop speed. The stop speed refers to a speed of the vehicle that is considered to be zero by the vehicle speed sensor 17, which may be approximately several centimeters per second. If the vehicle speed is equal to or lower than the stop speed and the brake switch 28 has output a manipulation detection signal of the brake pedal 25 for a predetermined time period (for example, 0.5 seconds), the CPU 32 controls the brake valve 13 to engage the parking brake 12. In this state, the CPU 32 actuates the parking brake 12 regardless of the position of the shift lever 29.

The CPU 32 disengages the parking brake 12 based on signals from the acceleration sensor 26, the shift switch 30 and the pressure sensor 22. When disengaging the parking brake 12 when the forklift is on a slope, the CPU 32 prevents the forklift from undesirably moving downhill.

The operation of the braking apparatus of FIG. 1 will now be described.

The CPU 32 receives signals from the acceleration sensor 26 and controls the throttle actuator 7 such that the throttle opening corresponds to the depression amount of the acceleration pedal 23. The engine 1 runs at an engine speed corresponding to the throttle opening. The engine 1 actuates the hydraulic pump 18 to supply oil to the lift cylinder. The rotation of the engine 1 is transmitted to the transmission 3 through the output shaft 1a and the torque converter 2.

When the shift lever 29 is at the neutral position N, the oil pressure is not supplied to the pressure chambers 8a, 9a of the clutch valves 10, 11, which maintain the clutches 8, 9 disengaged and rotation of the engine output shaft 1a is not transmitted to the output shaft 3b of the transmission 3. When the shift lever 29 is at the forward position F, the forward clutch valve 10 supplies oil to the oil chamber 8a, which engages the forward clutch 8. Accordingly, the rotation of the engine output shaft 1a is transmitted to the output shaft 3b through the forward clutch 8. When the shift lever 29 is at the reverse position R, the reverse clutch valve 11 supplies oil to the pressure chamber 9a, which engages the reverse clutch 9. Accordingly, the rotation of the engine output shaft 1a is transmitted to the output shaft 3b through the reverse clutch 9.

In order to carry a load by slowly moving the forklift, the operator depresses the inching pedal 24 to the inching position. Accordingly, the inching switch 27 outputs an inching signal. Upon receipt of the inching signal, the CPU 32 causes a clutch 8, 9 that is currently selected by the shift switch 30, for example, the forward clutch 8, to be partially engaged. Specifically, the CPU 32 outputs a signal to control the opening of the forward clutch valve 10 to a predetermined opening position. As a result, engine power that is transmitted to the transmission output shaft 3b is decreased. Thus, even if the engine speed is increased due to manipulation of the fork 19, the forklift moves slowly.

When the forklift is moving, the brake valve 13 supplies oil pressure to the pressure chamber 12c of the parking brake 12, which maintains the brake pads 12b at the disengaged position.

When the operator depresses the brake pedal 25 or the inching pedal 24 beyond the inching position, the brake pedal 25 is moved to the braking position. In this state, the brake switch 28 sends a braking signal to the CPU 32. The CPU 32 counts the pulses of a signal from the vehicle speed sensor 17 per unit time and computes the vehicle speed. If the vehicle speed is equal to or less than the stop speed and the CPU 32 has been receiving the braking signal for a predetermined period (for example, 0.5 seconds), the CPU 32 outputs a braking command signal to the brake valve 13. The braking command signal causes the brake valve 13 to stop supplying oil pressure to the brake pressure chamber 12c. This allows the brake pads 12b to be pressed against the disks 12a by the force of the spring 12d. That is, the pads 12b are moved to the braking position, which engages the parking brake 12. In this manner, the operator can depress either the brake pedal 25 or the inching pedal 24 to stop the forklift and automatically engage the parking brake 12.

When the forklift is moving at a relatively high speed, the operator depresses either the inching pedal 24 or the brake pedal 25 to decelerate the forklift. Even if the operator releases the pedal 24, 25 depressed before the forklift speed is decreased below the stop speed, the forklift speed can still decrease below the stop speed. In this case, the CPU 32 does not receive a braking signal and therefore does not output the braking command signal to the brake valve 13.

The operation of the braking apparatus of FIG. 1 for disengaging the parking brake 12 will now be described.

When the forklift starts moving up on a slope and there is no load on the fork 19, disengaging the parking brake 12 with the engine idling does not cause the forklift to move backward as long as the shift lever 29 is at the forward position and the forward clutch 8 is engaged. However, if a load is on the fork 19, disengaging the parking brake 12 on a slope is likely to cause the forklift to move backwards.

When the shift lever 29 is not at the neutral position N, that is, when the shift lever 29 is at the forward position F or at the reverse position X, the shift switch 30 outputs a signal indicating that the shift lever 29 is not at the neutral position. If the parking brake 12 is engaged in this state, the CPU 32 computes the load weight W based on a signal from the pressure sensor 22 upon receipt of an acceleration signal from the acceleration sensor 26. Then, the CPU 32 computes the value of the threshold engine speed NE that corresponds to the weight W. The CPU 32 determines whether the actual engine speed is equal to or greater than the threshold speed NE based on signals from the engine speed sensor 15. If the actual engine speed is equal to or greater than the threshold speed NE, the CPU 32 outputs a disengagement signal to the brake valve 13 to disengage the parking brake 12. Accordingly, when the parking brake 12 is disengaged, the forklift does not move backward.

The apparatus of FIG. 1 has the following advantages.

(1) When the brake pedal 25 is depressed and the vehicle speed is equal to or less than the stop speed, the parking brake 12 is automatically engaged, which eliminates the necessity for a parking lever to engage the parking brake 12. Also, the operator does not have to keep the brake pedal 25 depressed temporarily stopped on a slope. Even if the operator does not depress the acceleration pedal 23, the forklift moves very slowly, or creeps, due to the mechanism of the torque converter 2. If the operator wishes to decrease the speed of the forklift to the creeping speed, the operator only needs to decelerate the forklift to a speed that is greater than the stop speed by depressing the brake pedal 25.

(2) When the forklift speed is less than the stop speed and the CPU 32 has received the braking signal for a predetermined period, the parking brake 12 is engaged. The parking brake 12 is engaged after the forklift is completely stopped, which reduces shock due to engagement of the parking brake 12. The engagement of the parking brake 12 therefore does not disturb the operator. Also, the life of the parking brake 12 is extended.

(3) The parking brake 12 is engaged when the engine 1 is stopped. Thus, if the forklift stops after the operator releases the brake pedal 25, the parking brake 12 is automatically engaged when the engine 1 is stopped. In other words, the operator does not have to manipulate a lever or switch to engage the parking brake 12. Thus, the apparatus of FIG. 1 eliminates the necessity for a means, which is manipulated by the operator, for engaging the parking brake 12 when the engine 1 is stopped, which simplifies the structure.

(4) The parking brake 12 is engaged by the spring 12d and disengaged by hydraulic force. Thus, compared to a device that uses electromagnetic force to disengage a parking brake, the apparatus of FIG. 1 is smaller.

(5) The transmission 3 includes the hydraulic forward and reverse clutches 8, 9, which transmit rotation of the engine 1 to the output shaft 3b through the torque converter 2. The parking brake 12 is located in the transmission 3. The parking brake 12 is engaged by the spring 12d and disengaged by the hydraulic force. The parking brake 12 therefore occupies relatively little space. Oil pressure for disengaging the parking brake 12 is easily obtained from the hydraulic pump located in the transmission 3.

(6) The parking brake 12 is disengaged when the acceleration pedal 23 is depressed with the shift lever 29 located in a position other than the neutral position N and the engine speed is higher than the threshold speed, which corresponds to the weight W of the load on the fork 19. Therefore, when the forklift is headed up a slope, disengaging the parking brake 12 does not cause the forklift to move backward.

(7) The weight of the load on the fork 19 is continuously monitored by the pressure sensor 22. The threshold engine speed, at which the parking brake 12 is disengaged, is proportional to the weight W of the load. In other words, the weight W of a given load on the fork 19 corresponds to one threshold speed of the engine 1. Therefore, for each value of the load weight W, the threshold engine speed is optimized, or minimized.

A second embodiment of the present invention will now be described with reference to FIG. 4. In the embodiment of FIGS. 1 and 2, once the parking brake 12 is engaged, releasing the braking means does not disengage the parking brake 12. In the embodiment of FIG. 4, if the parking brake 12 is engaged by manipulating the braking means with a force that is weaker than a predetermined level, releasing the braking means disengages the parking brake 12.

Also, the embodiment of FIG. 4 is different from the embodiment of FIGS. 1 and 2 in that the service brakes 6 are eliminated. In the embodiment of FIG. 4, one of the clutches 8, 9 that is not currently used for moving the forklift is used as a service brake. Like or the same reference numerals are given to those components that are like or the same as the corresponding components of the embodiment of FIGS. 1 and 2.

A brake switch 37 is located near the brake pedal 25. The brake pedal 25 detects when the brake pedal is located in the braking position. A manipulation force detection means, which is a manipulation force sensor 38, is coupled to the brake pedal 25 to detect the force applied to the brake pedal 25. The force sensor 38 includes a cylinder, which has a chamber filled with oil. Two pistons are located in the cylinder at the ends of the chamber. The first piston has a piston rod 38a, which is coupled to the brake pedal 25. A spring is located between the second piston and the bottom of the cylinder. The force of the spring is determined such that the relationship between the force applied to the pedal 25 and the depression amount of the pedal 25 is substantially the same as that of the apparatus of FIG. 1, which has the service brakes 6. When the brake pedal 25 is depressed, the oil pressure in the cylinder chamber increases in proportion to the applied force. A pressure sensor (not shown) detects the oil pressure and outputs a detection signal the value of which corresponds to the applied force, or depression force.

The force sensor 38 is connected to the CPU 32 through an A/D converter (not shown) and the input interface 35. The brake switch 37 is connected to the CPU 32 through the input interface 35. A memory means, or the ROM 33, stores a map or an equation that represents the relationship between the force applied to the brake pedal 25 and value of current supplied to one of the clutches 8, 9 to generate a braking force corresponding to the force applied to the brake pedal 25.

The CPU 32 computes the force applied to the brake pedal 25 based on a signal from the force sensor 38. The CPU 32 then computes the level of current that corresponds to the force applied to the brake pedal 25 and outputs the current level to one of the clutch valves 10, 11 of one of the clutches 8, 9 that is not currently being used for moving the forklift. As a result, a braking force, the magnitude of which corresponds to the force applied to the brake pedal 25, is generated.

The CPU 32 controls the brake valve 13 such that the parking brake 12 is engaged under the same conditions as the embodiment of FIGS. 1 and 2. A releasing means, which is the CPU 32 in this embodiment, determines whether the force applied to the brake pedal 25 is equal to or greater than a predetermined level. When the brake pedal 25 is released before the predetermined amount of force has been applied to the pedal 25, the CPU 32 controls the brake valve 13 to disengage the parking brake 12 after the pedal 25 is released. If the brake pedal 25 is released after a force that is greater than the predetermined level is applied to the pedal 25, the CPU 32 controls the brake valve 13 such that the parking brake 12 continues to be engaged after the pedal 25 is released. In this case, the CPU 32 controls the brake valve 13 to disengage the parking brake 12 when at least the acceleration pedal 23 is depressed. In other words, the CPU 32 disengages the parking brake 12 under the same condition as the first embodiment.

In addition to the advantages (1) to (7) of the first embodiment, the second embodiment has the following advantages.

(8) If the brake pedal 25 is released after being depressed by a force smaller than the predetermined level when the parking brake 12 is engaged, the parking brake 12 is disengaged. If the brake pedal 25 is released after being depressed by a force that is equal to or greater than the predetermined level, the parking brake 12 continues to be engaged. Thus, the operator can maintain or disengage the parking brake 12 by controlling the force applied to the brake pedal 25. For example, when the forklift is moving very slowly, it is preferable that the forklift starts creeping after the operator releases the brake pedal 25. This can be achieved by depressing the brake pedal 25 or the inching pedal 24 with a weak force. When stopping the forklift on a slope, if the operator depresses the brake pedal 25 with a relatively great force, releasing the brake pedal 25 does not disengage the parking brake 12, and thus, the forklift is prevented from moving downward.

(9) The braking means includes the brake pedal 25 and the inching pedal 24, which moves integrally with the brake pedal 25 when the brake pedal 25 is depressed by an amount greater than a predetermined amount. When the inching pedal 24 is at the inching position, a clutch that is currently being used for moving the forklift is partially engaged. Thus, when the forklift is moving very slowly, the operator can temporarily stop the forklift and permit the forklift to creep again by using only the inching pedal 24. In other words, the operator does not need to step on the acceleration pedal 23 to start the forklift, which simplifies the operation of the forklift.

(10) The second embodiment does not require the service brakes 6, which reduces the number of manufacturing steps and the manufacturing cost.

It should be apparent to those skilled in the art that the present invention may be embodied in many other specific forms without departing from the spirit or scope of the invention. Particularly, it should be understood that the invention may be embodied in the following forms.

Figure 3:
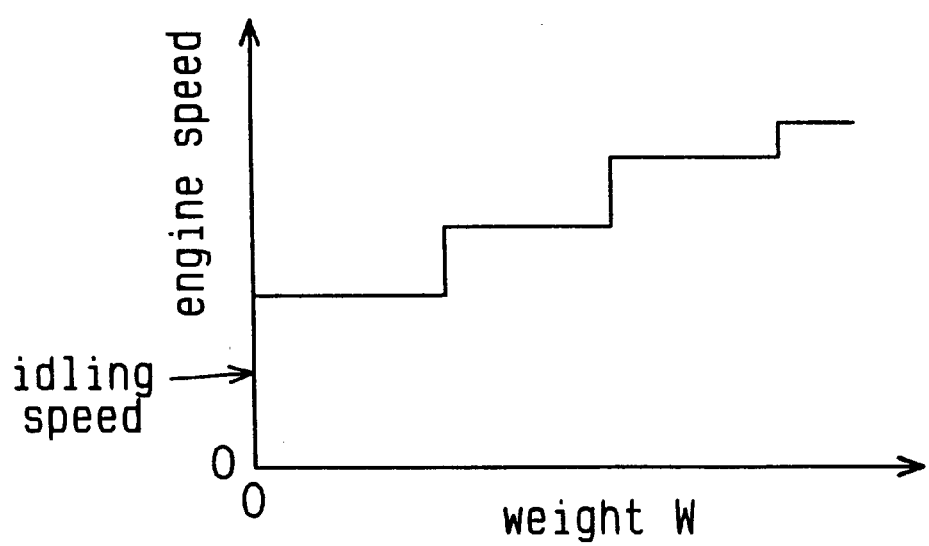
FIG. 3 is a second graph showing the relationship between the weight of a load and threshold engine speeds for releasing a brake.

In the first embodiment, the threshold engine speed, above which the parking brake 12 is engaged, has a one-to-one relationship with the load weight W detected by the pressure sensor 22 as shown in the graph of FIG. 2. However, as shown in FIG. 3, the threshold engine speed NE may be discretely increased.

The conditions for disengaging the parking brake 12 may be satisfied when a manipulation detection signal is output from the acceleration sensor 26. It is preferable that the operator be able to select the creeping speed and slow moving speed of the forklift. If the parking brake 12 is disengaged every time the acceleration sensor 26 outputs a signal indicating that the acceleration pedal 23 is is depressed, the operator can disengage the parking brake 12 simply by depressing the acceleration pedal 23. Thus, when the forklift carries a load on a flat road surface, the operator can easily switch between creeping speed and the slow moving speed, which facilitates the operation.

The conditions for disengaging the parking brake 12 may be satisfied when the acceleration sensor 26 outputs a manipulation detection signal and the shift lever 29 is not located at the neutral position N. In this case, the forklift is smoothly started on a sloped road if there is no load on the fork 19. When starting the forklift on a sloped road with a heavy load on the fork 19, the operator must adjust the engine speed before shifting the lever 29 from the neutral position N. However, the pressure sensor 22 can be omitted and the operation of the CPU 32 will be simplified.

The forklift may have a detecting means, or an inclination sensor, for detecting an inclination of the road and the threshold engine speed may be determined based on the detected inclination and the weight W of the load. The inclination sensor may be a potentiometer type or a torque balance type. The inclination sensor is connected to the CPU 32 through an A/D converter and the input interface. The CPU 32 computes the inclination of the road surface based on signals from the inclination sensor and sets a threshold engine speed corresponding to the road inclination. Specifically, the CPU 32 multiplies a threshold engine speed for the same load when the forklift is on a flat road surface by the road inclination angle and a proportion constant. When the engine speed reaches the computed threshold value, the CPU 32 sends a disengagement signal to the brake valve 13. This structure more effectively prevents the forklift from undesirably moving downward when the parking brake 12 is disengaged when the vehicle is on a sloped road.

Instead of determining the threshold value of the engine speed based on the road inclination and the load weight W, a single threshold engine speed, which corresponds to the maximum load weight W, may be used. In this case, the forklift includes an inclination detection means. If the forklift is heading up a slope, the parking brake 12 is disengaged when the engine speed reaches the threshold value regardless of the inclination angle. In this case, the inclination detection means needs not detect the angle of the inclination. Therefore, the detection means has a simple construction. Also, the CPU 32 does not require information about the load weight, which simplifies the operation of the CPU 32. Instead of detecting whether the forklift is on a slope, whether the angle of the inclination is equal to or greater than a predetermined threshold angle may be detected. In this case, if the inclination angle is equal to or greater than the threshold angle, the parking brake 12 is disengaged when the engine speed reaches the threshold value.

The inclination may be detected without using the inclination sensor. In other words, the inclination detection means may comprise other sensors. For example, the inclination may be determined based on the relationship between the vehicle speed and the engine speed. When the forklift is stopped, the determined inclination angle may be stored in a non-volatile memory. The stored inclination angle is then used when the forklift is started. The non-volatile memory may be an electrical erasable programmable ROM (EEPROM) or a RAM with a back-up battery. This construction does not require an inclination sensor. The CPU 32 determines the road inclination using signals from the engine speed sensor 15 and the vehicle speed sensor 17, which are already installed in the apparatus.

If the parking brake 12 is disengaged based on signals from the inclination detection means, the shift switch 30 may output a signal that indicates whether the position of the shift lever 29 matches the actual moving direction of the forklift. The CPU 32 may send a disengagement signal to the brake valve 13 when the shift switch 30 outputs a signal that indicates the shift lever position matches the actual moving direction of the forklift. Specifically, if the forklift is stopped after moving uphill in the forward direction, the operator may shift the shift lever 29 to the neutral position N from the forward position F. The CPU 32 outputs a disengagement signal when the shift lever 29 is shifted to the forward position F again. When the forklift is moving uphill in the rearward direction, the CPU 32 operates in the same manner. That is, when the forklift is stopped and started again, the CPU 32 disengages the parking brake 12 only if the shift lever 29 is shifted to the reverse position. Thus, if the operator erroneously shifts the shift lever 29 to a position that is opposite to the lever position before the forklift was stopped, the parking brake 12 is not disengaged. Therefore, the forklift is not moved in an undesirable direction.

In the illustrated embodiments, the parking brake 12 is located in the transmission 3. The parking brake 12 is engaged by the force of the spring 12d and disengaged by the hydraulic pump located in the transmission 3. However, the parking brake 12 may be located on a propeller shaft (not shown) between the transmission 3 and the differential gear 4. The parking brake 12 may be disengaged by the hydraulic pump 18, which is used for actuating the lift cylinder 20. In this case, conventional transmission having a torque converter can be used.

In the illustrated embodiments, the parking brake 12 is engaged and disengaged by the spring force and hydraulic force. However, the parking brake 12 may be engaged and disengaged by a solenoid.

The apparatus of FIG. 4 may include a service brake and the braking force may be controlled by the service brake. In this case, the force applied to the brake pedal 25 is detected based on the depression amount of the brake pedal 25. The CPU 32 disengages the parking brake 12 based on whether the depression amount of the brake pedal 25 is greater than a predetermined amount.

In the embodiment of FIG. 4, the manipulation force detection means may be any form so long as it detects that the manipulation force is equal to or greater than the predetermined level. The manipulation force detection means needs not continuously detect the manipulation force. For example, the manipulation force detection means may be a limit switch. The limit switch detects that the force applied to the brake pedal 25 is above the predetermined range.

Like the embodiment of FIG. 4, the service brake 6 may be omitted from the apparatus of FIG. 1. The braking force may be generated by simultaneously engaging the forward clutch 8 and the reverse clutch 9.

If the service brake 6 is omitted, the parking brake 12 may also function as a service brake. For example, a means for detecting the depression amount of the brake pedal 25 and an electromagnetic proportional valve for continuously adjusting the opening of the brake valve 13 may be provided. In this case, the ROM 33 stores a map or an equation representing the relationship between the depression amount of the brake pedal 25 and the opening size of the brake valve 13 for obtaining the corresponding braking force. The CPU 32 controls the brake valve 13 such that the valve opening corresponds to the depression amount of the brake pedal 25. This construction does not require the service brake 6, which reduces the manufacturing step and cost of the forklift. Also, if the parking brake 12 also functions as a service brake, the forward clutch valve 10 and the reverse clutch valve 11 may be simultaneously controlled such that the braking force is partly generated by the forward and reverse clutch 8, 9.

In the illustrated embodiments, the clutches 8, 9 and the hydraulic pump for supplying oil to the chambers 8a, 9a, 12c are provided inside the transmission 3. However, oil may be supplied to the chambers 8a, 9a, 12c by the hydraulic pump 18, which supplies oil to the lift cylinder 20.

In the industrial vehicle disclosed in Japanese Unexamined Patent Publication No. 6-247190, the vehicle speed is controlled in accordance with the manipulation amount of the acceleration means and the engine speed is controlled in accordance with the manipulation amount of the loading lever. If applied to the vehicle of the publication, the apparatus of the present invention will facilitate the control of the vehicle when the vehicle simultaneously moves and manipulates the load. In this case, the inching pedal 24 is not necessary.

In the illustrated embodiments, the rotation of the engine 1 is transmitted to the transmission 3 through the torque converter 2. However, rotation of the engine 1 may be directly transmitted to the transmission 3. Alternatively, rotation of the engine 1 may be transmitted to the transmission 3 through a clutch.

The moving direction of the forklift is switched by the shift lever 29 in the illustrated embodiments. The moving direction may be switched by buttons. The buttons correspond to the forward position F, the reverse position R and the neutral position N, respectively. The shift switch 30 comprises contacts actuated by the buttons.

The illustrated apparatuses of FIGS. 1 and 4 may be used in other industrial vehicles that have a hydraulic system for manipulating a cargo. For example, the apparatuses may be used in a bucket loader.

In the illustrated embodiments, the brakes are controlled by pedals. The brakes may be controlled by a manually controlled lever.

What is claimed is:

1. A parking brake apparatus for an industrial vehicle, comprising:

a braking member for maintaining the industrial vehicle in a stationary position;

holding means for holding the braking member in an engaged state;

releasing means for releasing the braking member from the engaged state;

braking means for controlling the braking member;

a first detector for detecting whether the braking means is being manipulated by a manipulation force that is equal to or greater than a predetermined value; and a controller for controlling the releasing so that the braking member is placed in the engaged state;

wherein, if the braking means is released after being manipulated by a manipulation force that is less than the predetermined value while the braking member is engaged, the control means controls the releasing means to release the braking member from the engaged state; and wherein if the braking means is released after being manipulated by a manipulation force that is equal to or greater than the predetermined value while the braking member is engaged, the control means controls the releasing means to maintain the braking member in the engaged state.

2. The parking brake apparatus according to claim 1, wherein the braking means includes a brake pedal and an inching pedal, wherein the inching pedal moves integrally with the brake pedal when the brake pedal is depressed beyond a predetermined amount; and wherein, when located at an inching position, the inching pedal partially engages a clutch, and wherein when the inching pedal is depressed beyond the inching position, the brake pedal moves integrally with the inching pedal.

3. The parking brake apparatus according to claim 2, wherein the braking member is engaged when the engine of the vehicle is not running.

4. The parking brake apparatus according to claim 3, wherein the industrial vehicle includes a hydraulic forward clutch, a hydraulic reverse clutch, a transmission having an output shaft and a torque converter, wherein the transmission transmits force of the engine to the output shaft through the torque converter, and wherein the braking member is located within the transmission and is engaged by the force of a spring and disengaged by hydraulic pressure.

5. The parking brake apparatus according to claim 4, further comprising:

a second detector for detecting a speed of the vehicle;

wherein, the controller, upon receiving a signal from the first detector indicating that the braking means is being manipulated, controls the releasing means to engage the braking member if the vehicle speed is greater than a predetermined value, as indicated by a signal generated by the second detector.

6. The parking brake apparatus according to claim 5, wherein, when the control means has received a signal from the first detector indicating that the braking means has been manipulated for a predetermined period, the control means controls the releasing means to engage the braking member.

* * * * *

UNITED STATES PATENT AND TRADEMARK OFFICE
CERTIFICATE OF CORRECTION

PATENT NO. : 6,287,236 B1  
DATED : September 11, 2001  
INVENTOR(S) : Kazuo Ishikawa Page 1 of 1

It is certified that error appears in the above-identified patent and that said Letters Patent is hereby corrected as shown below:

<u>Column 6,</u>  
Line 61, please change "reverse position X, the" to -- reverse position R, the --.

Signed and Sealed this

Fourteenth Day of May, 2002

*Attest:*

*Attesting Officer*

JAMES E. ROGAN  
*Director of the United States Patent and Trademark Office*